US008548209B2

United States Patent
Lung

(10) Patent No.: US 8,548,209 B2
(45) Date of Patent: Oct. 1, 2013

(54) USER SETTINGS SYSTEM AND METHOD OF USING THE SAME

(75) Inventor: Chien-Lih Lung, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/014,730

(22) Filed: Jan. 27, 2011

(65) Prior Publication Data

US 2012/0045102 A1 Feb. 23, 2012

(30) Foreign Application Priority Data

Aug. 20, 2010 (TW) .............................. 99128036 A

(51) Int. Cl.
G06K 9/00 (2006.01)
(52) U.S. Cl.
USPC .............. 382/117; 340/575; 382/104; 701/45
(58) Field of Classification Search
USPC ............ 382/118, 117, 104; 340/575; 701/45
See application file for complete search history.

(56) References Cited

U.S. PATENT DOCUMENTS

| 7,199,767 B2* | 4/2007 | Spero ................................. 345/7 |
| 7,788,008 B2* | 8/2010 | Breed .............................. 701/45 |
| 7,864,029 B2* | 1/2011 | Huang et al. ................ 340/426.1 |
| 8,200,422 B2* | 6/2012 | Shibasaki ...................... 701/408 |
| 2004/0234109 A1* | 11/2004 | Lemelson et al. ............. 382/118 |
| 2005/0193212 A1* | 9/2005 | Yuhara ........................... 713/186 |
| 2007/0120691 A1* | 5/2007 | Braun ........................... 340/576 |
| 2008/0297336 A1* | 12/2008 | Lee ............................... 340/439 |
| 2012/0045102 A1* | 2/2012 | Lung ............................. 382/117 |

* cited by examiner

*Primary Examiner* — Gregory M Desire
(74) *Attorney, Agent, or Firm* — Altis & Wispro Law Group, Inc.

(57) ABSTRACT

A user settings system includes a trigger module, an image acquisition module, a microprocessor and a database. The trigger module implements the image acquisition module to capture a pupil image of a driver. The database is coupled with the microprocessor, and stores at least one pupil image of at least one authorized user and the personalized settings of the authorized user. The microprocessor includes a comparison module, a response module, and an implementation module. The comparison module compares the pupil image of the driver captured by the image acquisition module with the stored pupil images in the database and generates a result notification to the response module. The response module determines whether or not a matching pupil image is found. The implementation module automatically activates the personalized settings stored in the database.

8 Claims, 2 Drawing Sheets

USER SETTINGS SYSTEM AND METHOD OF USING THE SAME

BACKGROUND

1. Technical Field

The present disclosure generally relates to vehicle settings, and more particularly to a system for convenient personalization of settings for users, and a method of using the same.

2. Description of Related Art

In many cases, a family may share a single vehicle. Accordingly user settings required by individual users, such as seat height, steering wheel position, mirror orientation, and other settings, are different. As a result, adjustment of the various settings is inconvenient, requiring resetting of each setting with every use.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
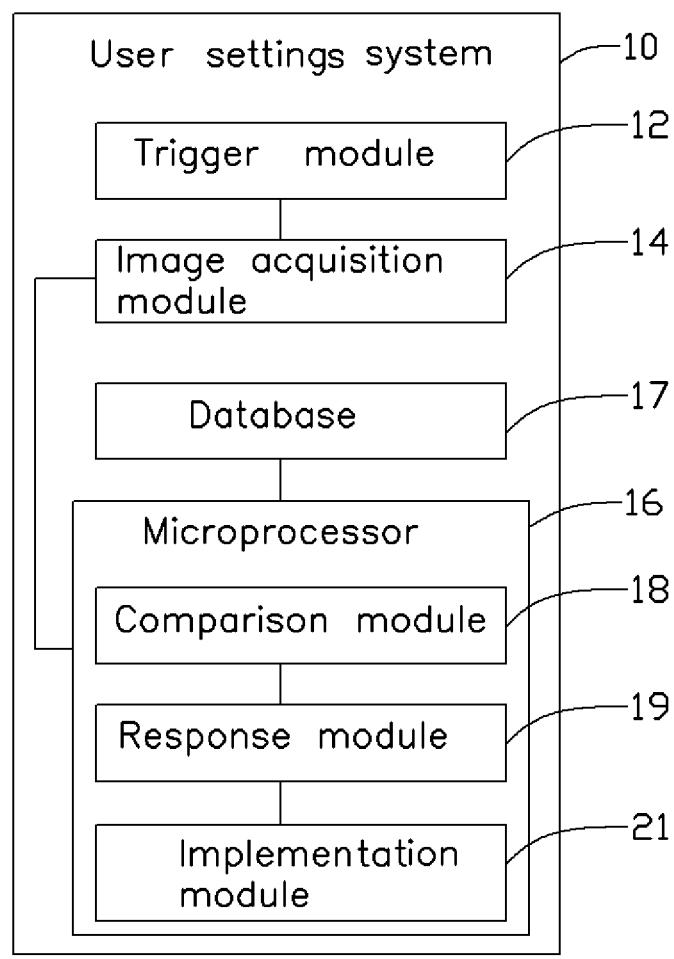
FIG. 1 is a block diagram of an embodiment of a user settings system.

Referring to FIG. 1, a user settings system 10, for automatically setting for example, driver seat height, steering wheel position, and rear and side mirrors orientations, includes a trigger module 12, an image acquisition module 14, a microprocessor 16 and a database 17. The database 17 is coupled with the microprocessor 16. The microprocessor 16 includes a comparison module 18, a response module 19, and an implementation module 21.

The trigger module 12 actuates the image acquisition module 14. In the illustrated embodiment, the trigger module 12 includes a detection device disposed on the handle of the vehicle door. When an attempt is made to open the vehicle door, the detection device registers the attempt and the trigger module 12 triggers the image acquisition module 14. It should be pointed out that the trigger module 12 may be an infrared detection device for detecting a driver and notifying the trigger module 12 to implement the image acquisition module 14.

The image acquisition module 14 includes a camera (not shown) and an illumination device (not shown), and may be positioned in the vehicle. In the illustrated embodiment, the image acquisition module 14 is positioned in the center of the steering wheel. The camera is configured to capture at least one pupil image of the driver triggering the trigger module 12. The illumination device supports the image acquisition module 14 under insufficient light. Brightness of the illumination device may change periodically to stimulate the pupil of the driver to shrink or dilate, such that a plurality of pupil images may be captured. The illumination device may be an infrared illumination device, which is to capture more detailed texture of the pupil of the driver and protect the pupil from damages by the bright light emitted from the illuminating device. The image acquisition module 14 may further include a position adjusting device (not shown) on which the camera and the illumination device are fixed, such that the angle of the camera and the illumination device relative to the driver may be automatically adjusted according to the position and the height of the driver.

The database 17 is configured to store the pupil images of at least one authorized user, a plurality of which can be acquired using the image acquisition module 14, and a plurality of personalized settings of the authorized user.

The microprocessor 16 is coupled with a control unit (not shown) of the vehicle to automatically install the personalized settings of the authorized user of the vehicle.

The comparison module 18 is capable of comparing the pupil images captured by the image acquisition module 14 with the stored pupil images in the database 17 by performing comparisons therebetween, and generating a result notification to the response module 19.

The response module 19, based on the comparison result generated by the comparison module 18, generates a corresponding confirmation if a matching pupil image is found in the database 17. In the illustrated embodiment, if the similarity between the captured pupil image and the at least one stored pupil image in the database 17 exceeds or equals a preset value, the response module 19 then determinates that a matching pupil image is found. If the similarity between the captured pupil image and each of the pupil images stored in the database 17 is less than the preset value, the response module 19 then determinates that no matched pupil image is found.

The implementation module 21 is capable of automatically activating the personalized settings stored in the database 17 of the authorized driver according to the determination of the response module 19 if the response module 19 determinates that a matching pupil image is found.

Figure 2:
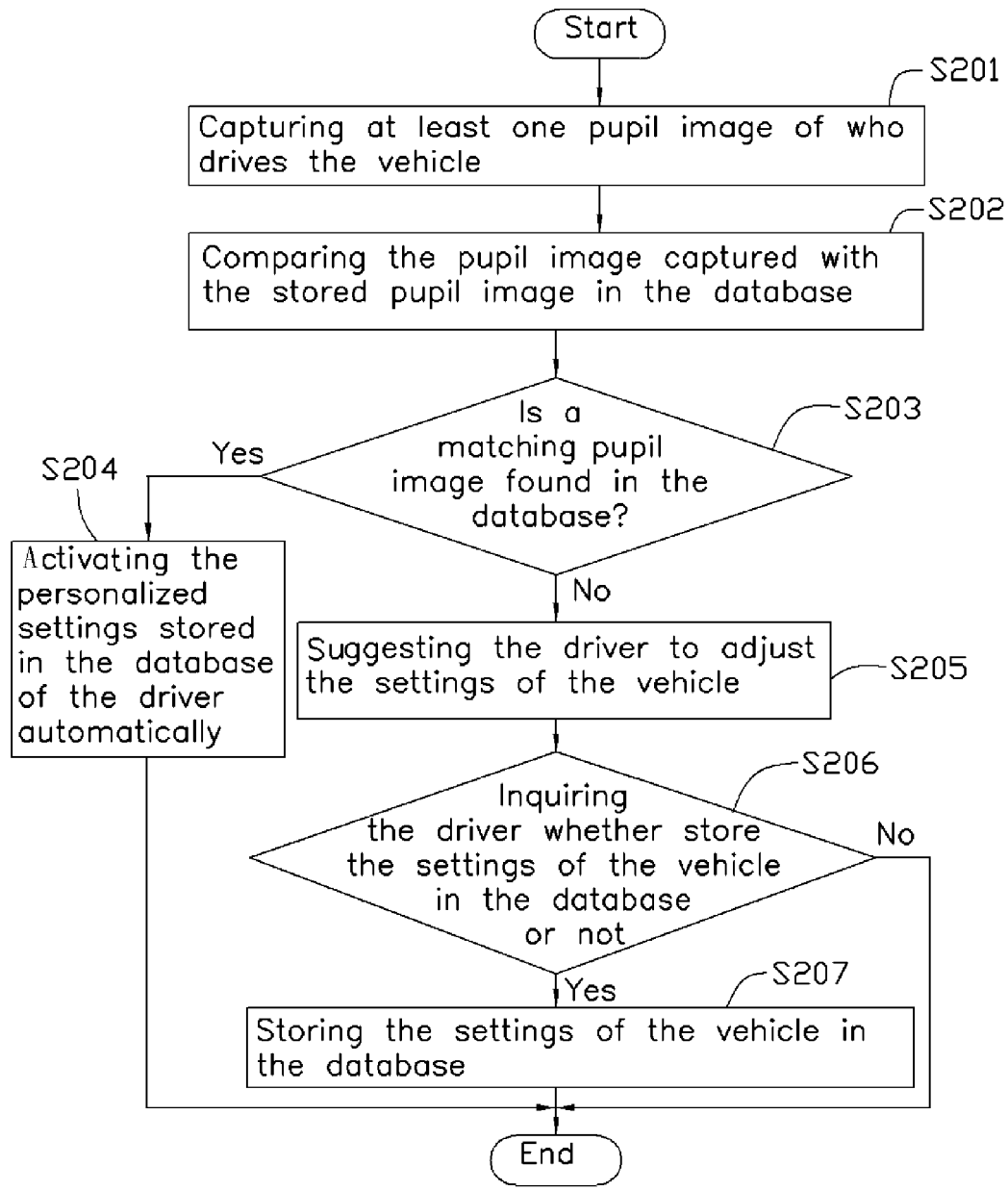
FIG. 2 is a flowchart of a method of using the system of FIG. 1.

Referring to FIG. 2, a method for personalizing a plurality of settings of a vehicle using the user setting system 10 shown in FIG. 1 is as follows.

In step S201, at least one pupil image of a driver is captured. In the illustrated embodiment, the at least one pupil image is captured by an image acquisition module 14 triggered or actuated by a trigger module 12 when the driver approaches or sits in the driver seat of the vehicle.

In step S202, the captured pupil image of the driver is compared with each of the stored pupil images in a database 17. In the illustrated embodiment, the captured pupil image is compared with the stored pupil images in the database 17 by a comparison module 18.

In step S203, if the similarity between the captured pupil image and each pupil image stored in the database is less than a preset value, step S205 is then implemented. If the similarity between the captured pupil image and at least one stored pupil image in the database exceeds or equals the preset value, step S204 is implemented.

In step S204, one or more personalized settings stored in the database 17 for the driver are activated automatically.

In step S205, a suggestion is made to the driver to adjust the settings of the vehicle.

In step S206, the driver receives a prompt to store the captured pupil image of the driver and the settings made by the driver in the database 17. If the driver chooses "yes", step S207 is implemented, otherwise, the method is completed and terminates.

In step S207, the captured pupil image and the settings are stored in the database 17.

The user setting system 10 automatically installs the personalized settings of the driver by capturing a pupil image of the driver for comparison with the pupil images stored in the database 17, thereby enhancing convenience.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A user settings system, comprising:
a trigger module;
an image acquisition module comprising:
   a camera capturing a pupil image of a driver triggering the trigger module;
   an illumination device illuminating under insufficient light; and
   a position adjusting device, wherein the camera and the illumination device are fixed on the position adjusting device, the position adjusting device automatically adjusts angles of both the camera and the illumination device relative to the driver according to a position and a height of the driver, before the camera captures the pupil image of the driver triggering the trigger module;
a microprocessor, the microprocessor comprising a comparison module, a response module, and an implementation module; and
a database coupled with the microprocessor and storing a pupil image of each of at least one authorized user and a personalized setting of each of the at least one authorized user;
wherein the trigger module actuates the image acquisition module to capture the pupil image of a driver triggering the trigger module, the comparison module compares the pupil image of the driver captured by the image acquisition module with the pupil image of each of the at least one authorized user stored in the database and generates a result notification to the response module, the response module makes a determination whether or not the pupil image captured by the image acquisition module matches with a pupil image stored in the database according to an output signal of the comparison result, and generates a corresponding confirmation to the implementation module, and the implementation module determines whether a personalized setting stored in the database is automatically installed by the implementation module according to the determination of the response module.

2. The user settings system of claim 1, wherein the illumination device is an infrared illumination device.

3. The user settings system of claim 2, wherein the image acquisition module further comprises a position adjusting device, and the camera and the illumination device are fixed on the position adjusting device.

4. The user settings system of claim 1, wherein a brightness of the illumination device changes periodically.

5. A user settings system, comprising:
a trigger module;
an image acquisition module comprising:
   a camera capturing a pupil image of a driver triggering the trigger module; and
   a position adjusting device, wherein the camera is fixed on the position adjusting device, the position adjusting device automatically adjusts an angle of the camera relative to the driver according to a position and a height of the driver, before the camera captures the pupil image of the driver triggering the trigger module;
a microprocessor, the microprocessor comprising a comparison module, a response module, and an implementation module; and
a database coupled with the microprocessor and storing a pupil image of each of at least one authorized user and a personalized setting of each of the at least one authorized user;
wherein the trigger module actuates the image acquisition module to capture the pupil image of a driver triggering the trigger module, the comparison module compares the pupil image of the driver captured by the image acquisition module with the pupil image of each of the at least one authorized user stored in the database and generates a result notification to the response module, the response module makes a determination whether or not the pupil image captured by the image acquisition module matches with a pupil image stored in the database according to an output signal of the comparison result, and generates a corresponding confirmation to the implementation module, and the implementation module determines whether a personalized setting stored in the database is automatically installed by the implementation module according to the determination of the response module.

6. A method for personalizing settings of a vehicle, comprising:
storing a pupil image of each of at least one authorized user and a personalized setting of each of the at least one authorized user;
automatically adjusting an angle of a camera relative to a driver by a position adjusting device on which the camera is fixed, according to a position and a height of the driver;
capturing a pupil image of the driver of the vehicle by the camera after the angle of the camera relative to the driver is automatically adjusted;
comparing the captured pupil image of the driver with the pupil image of each of at least one authorized user stored in a database;
determining whether or not a matching pupil image is found in the database; and
activating a personalized setting stored in the database of the authorized user whose pupil image matches with the captured pupil image if the matching pupil image is found in the database.

7. The method of claim 6, wherein the step of determining if a matching pupil image is found in the database comprises: determining that the matching pupil image is found if the similarity between the captured pupil image and a pupil image stored in the database exceeds or equals a preset value; and determining that no matching pupil image is found in the database if the similarity between the captured pupil image and each pupil image stored in the database is less than the preset value.

8. The method of claim 6, further comprising making a prompt to the driver to adjust the settings of the vehicle and storing the settings in the database if no matching pupil image is found in the database.

* * * * *